Reissued Sept. 27, 1932

Re. 18,607

UNITED STATES PATENT OFFICE

ALBERT M. CLIFFORD, OF STOW, OHIO, ASSIGNOR TO THE GOODYEAR TIRE & RUBBER COMPANY, OF AKRON, OHIO, A CORPORATION OF OHIO

DETERIORATION INHIBITOR FOR RUBBER

No Drawing. Original No. 1,813,609, dated July 7, 1931, Serial No. 457,495, filed May 29, 1930. Application for reissue filed June 13, 1932. Serial No. 617,043.

My invention relates to the manufacture of rubber and rubber-like compounds and has particular relation to the manufacture of compounds of that character which are exposed to the effects of light, heat and oxygen. One of the objects of the invention is to provide a rubber compound which offers particularly high resistance to the above indicated weathering agencies, thereby preserving the material and extending its period of usefulness.

Heretofore, it has been observed that rubber and rubber-like materials such as balata or gutta percha upon exposure to light, air or heat, either alone or in combination, tend to harden quickly, losing their tensile strength and elasticity, thus rendering them unfit for further service. It has been proposed to overcome or to retard these effects by incorporating into the compounds certain organic materials termed "antioxidants" or age retarders which tend to prevent the action of the ordinary weathering agencies. Numerous materials have been proposed for this purpose among which are diphenylamine, hydroquinone and certain reaction products of aldehydes and aromatic amines such as aldol and alpha naphthylamine.

However, most of the substances heretofore proposed as antioxidants have been objectionable for various reasons. Some of them are so expensive as to be impracticable for commercial use. Others are objectionable because of their tarry or pitchy nature, making them difficult to be handled and incorporated into rubber successfully. Still others are characterized by strong and disagreeable, sometimes even poisonous, odors necessitating special precautions in the ventilation in the plants in which they are employed.

My invention resides in the discovery that naphthyl substituted benzidine compounds, particularly mono naphthyl and dinaphthyl substituted benzidines are highly efficient as preservatives and greatly extend the period of utility of the rubber materials in which they are employed. Naphthyl benzidine of either the alpha or beta forms, may readily be prepared by subjecting benzidine and the naphthol to a temperature of 280 to 300 degrees C. in an autoclave for a period of 8 to 10 hours. The reaction product consists of two components, one being the mono substituted naphthylene and the other the disubstituted material. The formulæ of these materials are respectively as follows:

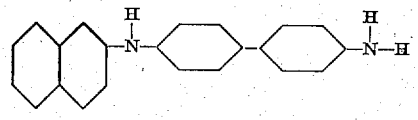

(mono naphthyl benzidine)

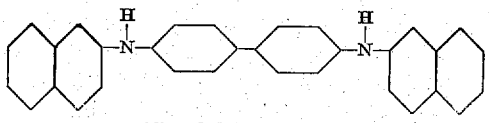

(dinaphthyl benzidine)

While only the beta derivatives of benzidine have been shown in the formulæ, it is of course to be understood that analogous methods may be employed in the manufacture of the alpha substituted material for use as antioxidants. Also, it is possible to obtain mixed alpha and beta substituted compounds by employing suitable conditions for the reaction. The naphthyl benzidines may be obtained in a state of sufficient purity for ordinary technical use by treating the crude reaction product with sodium hydroxide (5 per cent concentration) followed by thoroughly washing with water. If a purer grade of material is desired, the material obtained, as described above, may be repeatedly recrystallized from a mixture of alcohol and aniline. The compound so obtained may be extracted further with boiling xylene in order to separate the mono naphthyl derivative of the benzidine from the disubstituted material. The mono substituted material is crystallized from the xylene in comparatively pure form. The disubstituted benzidine, left as a residue from the extraction of the boiling xylene, has a melting point of 236 to 238 degrees C.

The invention is not limited to the naphthyl substituted benzidines but includes also the naphthyl substituted tolidines and the corresponding bixylidines. However, the latter materials are less practicable from a commercial viewpoint because of the expense involved in their preparation.

The above described naphthyl substituted benzidines may be employed as antioxidants in most of the standard rubber compounds, the following formulæ constituting specific examples in which they have been found to give excellent results.

*Compound A*

| | Parts |
|---|---|
| Rubber | 100 |
| Sulfur | 3 |
| Hexamethylene tetramine | 1 |
| Zinc oxide | 5 |
| Stearic acid | 1.5 |
| Antioxidant | 1 |

*Compound B*

| | |
|---|---|
| Smoked sheet | 100 |
| Carbon black | .6 |
| Zinc oxide | 92.6 |
| Sulfur | 3.5 |
| Diphenylguanidine | .7 |
| Antioxidant | 5 |

Two sets of samples were prepared from each of these two types of stock. These samples were then subjected to vulcanization for varying periods of time. One set from each type of stock was subjected immediately to physical tests in order to ascertain the tensile strength and elasticity thereof prior to ageing. The second set of samples was subjected to a period of artificial ageing or accelerated ageing which is equivalent to a number of years of natural ageing. Those samples prepared in accordance with Formula A were subjected to what is termed a low temperature test, the samples being placed in an oxygen bomb under pressure of 150 pounds per square inch for a period of six days at a temperature of 150 degrees C.

The second set of samples was subjected to what is termed a high temperature test, being placed in a bomb filled with air under a pressure of 80 pounds per square inch and subjected to a temperature of 114 degrees C. for a period of 7 hours. At the conclusion of these periods of artificial ageing, the samples were removed from the bombs and subjected to physical tests corresponding to those conducted upon the unaged samples. The results of these various tests are tabulated as follows:

LOW TEMPERATURE TEST

STOCK A

| Cure | | Stress in kgs/cm² at | | | Elong. at break | Per cent weight increase |
|---|---|---|---|---|---|---|
| Time in mins. | Temp. F° | 500% elong. | 700% elong. | Break | | |
| *Mono beta naphthyl benzidine* | | | | | | |
| ORIGINAL | | | | | | |
| 35 | 285 | 20 | 56 | 128 | 860 | |
| 50 | 285 | 25 | 82 | 162 | 815 | |
| 70 | 285 | 35 | 129 | 186 | 765 | |
| AGED 6 DAYS IN OXYGEN BOMB | | | | | | |
| 35 | 285 | 19 | 64 | 116 | 805 | |
| 50 | 285 | 25 | 92 | 135 | 765 | |
| 70 | 285 | 34 | 133 | 157 | 725 | |
| *Di-beta naphthyl benzidine* | | | | | | |
| ORIGINAL | | | | | | |
| 35 | 285 | 18 | 52 | 112 | 845 | |
| 50 | 285 | 21 | 67 | 128 | 815 | |
| 70 | 285 | 28 | 100 | 146 | 765 | |
| AGED 6 DAYS IN OXYGEN BOMB | | | | | | |
| 35 | 285 | 18 | 58 | 118 | 835 | .12 |
| 50 | 285 | 24 | 81 | 135 | 795 | .22 |
| 70 | 285 | 29 | 107 | 130 | 735 | .31 |

HIGH TEMPERATURE TEST

STOCK B

| | | 300% | 500% | | | |
|---|---|---|---|---|---|---|
| *Mono beta naphthyl benzidine* | | | | | | |
| ORIGINAL | | | | | | |
| 35 | 285 | 39 | 104 | 200 | 670 | |
| 50 | 285 | 47 | 123 | 228 | 650 | |
| 70 | 285 | 52 | 133 | 228 | 645 | |
| AGED 7 HOURS IN AIR BOMB | | | | | | |
| 35 | 285 | 32 | 72 | 87 | 560 | |
| 50 | 285 | 44 | 95 | 138 | 610 | |
| 70 | 285 | 48 | 104 | 121 | 550 | |
| *Di-beta naphthyl benzidine* | | | | | | |
| ORIGINAL | | | | | | |
| 35 | 285 | 36 | 100 | 158 | 610 | |
| 50 | 285 | 40 | 112 | 176 | 610 | |
| 70 | 285 | 45 | 120 | 208 | 640 | |
| AGED 7 HOURS IN AIR BOMB | | | | | | |
| 35 | 285 | 14 | | 40 | 490 | |
| 50 | 285 | 19 | | 52 | 510 | |
| 70 | 285 | 22 | | 66 | 530 | |

It is apparent that those materials containing either the mono or dinaphthyl substituted benzidine resisted the attacks of oxygen and heat under the comparatively severe conditions existing in the bomb and retained a large portion of their tensile strength and elasticity under conditions which would have reduced stocks containing no antioxidants to resinous masses substantially devoid of tensile strength and elasticity. As previously intimated, these new types of antioxidants, in addition to being highly effective as age retarders, are also comparatively inexpensive to manufacture and are neither odorous nor toxic in nature. For that reason, they may be employed in factories without any usual or extensive precautions in order to overcome odors or to prevent undesirable physiological effects upon the workmen employed in handling them.

Although I have described but the preferred forms of the invention, it will be apparent to those skilled in the art that the invention is not so limited, but that various modifications may be made therein without departing from the spirit of the invention or from the scope of the appended claims. It is intended that the patent shall cover, by suitable expression in the appended claims, whatever features of patentable novelty reside in the invention.

What I claim is:

1. A method of treating rubber which comprises incorporating therein a mono naphthyl benzidine.

2. A method of treating rubber which comprises incorporating therein a mono naphthyl di-amino biaryl, said biaryl being selected from a group consisting of biphenyl, bitolyl and bixylyl groups.

3. A method of preserving rubber which comprises subjecting it to vulcanization in the presence of a mono naphthyl substituted material selected from a class consisting of benzidine, tolidine and bixylidine.

4. A rubber product that has been vulcanized in the presence of a mono naphthyl benzidine.

5. A rubber product that has been vulcanized in the presence of a mono naphthyl diamino biaryl, said biaryl being selected from a group consisting of biphenyl, bitolyl and bixylyl groups.

6. A rubber product that has been vulcanized in the presence of a mono naphthyl substituted material selected from a class consisting of benzidine, tolidine and bixylidine.

In witness whereof I have hereunto signed my name.

Signed at Akron, in the county of Summit and State of Ohio, U. S. A., this 4th day of June, 1932.

ALBERT M. CLIFFORD.